United States Patent
Tsuge et al.

(10) Patent No.: US 7,426,619 B2
(45) Date of Patent: Sep. 16, 2008

(54) INTER-VOLUME MIGRATION SYSTEM, INTER-VOLUME RELOCATION METHOD, AND PROGRAM THEREFOR

(75) Inventors: Yoichiro Tsuge, Kawasaki (JP); Tatsundo Aoshima, Yokohama (JP); Nobuo Beniyama, Yokohama (JP); Tomoyuki Kaji, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 11/153,479

(22) Filed: Jun. 16, 2005

(65) Prior Publication Data

US 2006/0242376 A1     Oct. 26, 2006

(30) Foreign Application Priority Data

Apr. 22, 2005     (JP)     ............................ 2005-124762

(51) Int. Cl.
*G06F 12/00* (2006.01)
*G06F 13/00* (2006.01)
*G06F 13/28* (2006.01)
*G06F 17/30* (2006.01)
*G05B 13/02* (2006.01)

(52) U.S. Cl. .......................... 711/165; 707/204; 700/36

(58) Field of Classification Search .................. 711/165
See application file for complete search history.

(56) References Cited

U.S. PATENT DOCUMENTS

| | | | | | |
|---|---|---|---|---|---|
| 5,276,867 | A | * | 1/1994 | Kenley et al. | ............... 707/204 |
| 2004/0039891 | A1 | * | 2/2004 | Leung et al. | ................. 711/165 |
| 2005/0154852 | A1 | * | 7/2005 | Nakagawa et al. | .......... 711/170 |
| 2006/0288048 | A1 | * | 12/2006 | Kamohara et al. | .......... 707/200 |
| 2007/0112875 | A1 | * | 5/2007 | Yagawa | ..................... 707/200 |

FOREIGN PATENT DOCUMENTS

| | | |
|---|---|---|
| JP | 2001-067187 | 3/2001 |
| JP | 2004-295457 | 10/2004 |

* cited by examiner

*Primary Examiner*—Kevin Ellis
*Assistant Examiner*—Ryan Bertram
(74) *Attorney, Agent, or Firm*—Mattingly, Stanger, Malur & Brundidge, P.C.

(57) ABSTRACT

Provided is an inter-volume migration system that allows selection of a relocation-destination volume in consideration of a volume cost. The inter-volume migration system includes a storage subsystem having one or more volumes, an inter-volume relocation instruction module that relocates a data area from a relocation-source volume to a relocation-destination volume, a cost calculation module that calculates a cost value of a volume, and a volume selection module that selects a candidate for the relocation-destination volume based on the cost value of the volume calculated by the cost calculation module and constraints imposed on the relocation-destination volume.

15 Claims, 15 Drawing Sheets

DISK UNIT PRICE MANAGEMENT TABLE T100

| DISK ID | STORAGE SUBSYSTEM ID | DISK TYPE | DISK CAPACITY (GB) | DISK UNIT PRICE (¥) |
|---|---|---|---|---|
| 1 | 1000 | FC | 100 | 100000 |
| 2 | 2000 | FC | 100 | 80000 |
| 3 | 3000 | SATA | 100 | 50000 |
| C101 | C102 | C103 | C104 | C105 |

FIG. 3

VOLUME MANAGEMENT TABLE T200

| LOGICAL ID | STORAGE SUBSYSTEM ID | EXTERNAL STORAGE SUBSYSTEM ID | DISK TYPE | CAPACITY (GB) | RAID LEVEL | USE STATUS |
|---|---|---|---|---|---|---|
| 1 | 1000 | – | FC | 300 | RAID5 | IN USE |
| 2 | 1000 | – | FC | 100 | RAID1 | UNUSED |
| 3 | 1000 | – | FC | 200 | RAID1 | UNUSED |
| 4 | 1000 | – | FC | 300 | RAID1 | UNUSED |
| 5 | 1000 | – | FC | 400 | RAID1 | UNUSED |
| 6 | 1000 | – | FC | 300 | RAID5 | IN USE |
| 7 | 1000 | – | FC | 150 | RAID5 | UNUSED |
| 8 | 1000 | – | FC | 200 | RAID5 | UNUSED |
| 9 | 1000 | – | FC | 300 | RAID5 | UNUSED |
| 10 | 1000 | – | FC | 600 | RAID5 | UNUSED |
| 11 | 1000 | 2000 | FC | 200 | RAID1 | UNUSED |
| 12 | 1000 | 2000 | FC | 300 | RAID5 | UNUSED |
| 13 | 1000 | 2000 | FC | 600 | RAID5 | UNUSED |
| 14 | 1000 | 3000 | SATA | 200 | RAID1 | UNUSED |
| 15 | 1000 | 3000 | SATA | 300 | RAID5 | UNUSED |
| C201 | C202 | C203 | C204 | C205 | C206 | C207 |

DISK UNIT PRICE ENTRY SCREEN — T150

| DISK UNIT PRICE | |
|---|---|
| STORAGE SUBSYSTEM ID | 1000 |
| DISK TYPE | FC ▽ |
| DISK CAPACITY (GB) | 100 |
| DISK UNIT PRICE (¥) | 100000 |

R152, R153, R154, R155

CANCEL (B100)  OK (B200)

CONSTRAINT DESIGNATION SCREEN — T450

| COST CONSTRAINT | |
|---|---|
| VOLUME COST UPPER LIMIT | 10000 |
| VOLUME COST LOWER LIMIT | 500 |
| CANDIDATE LIST SORTING ORDER | ASCENDING ORDER ▽ |

R452, R453, R454

CANCEL (B400)  OK (B410)

RELOCATION-DESTINATION VOLUME SELECTION SCREEN

CANDIDATE VOLUME LIST

| SELECT | LOGICAL ID | STORAGE SUBSYSTEM ID | EXTERNAL STORAGE SUBSYSTEM | DISK TYPE | CAPACITY (GB) | RAID LEVEL | COST (¥) |
|---|---|---|---|---|---|---|---|
| ● | 15 | 1000 | 3000 | SATA | 300 | RAID5 | 666 |
| ○ | 12 | 1000 | 2000 | FC | 300 | RAID5 | 1066 |
| ○ | 9 | 1000 | — | FC | 300 | RAID5 | 1333 |
| ○ | 4 | 1000 | — | FC | 300 | RAID1 | 2000 |

C501　C502　C503　C504　C505　C506　C507　C508

CANCEL (B510)　OK (B520)

RELOCATION-DESTINATION VOLUME CONFIRMATION SCREEN

RELOCATION-SOURCE VOLUME

| LOGICAL ID | STORAGE SUBSYSTEM ID | EXTERNAL STORAGE SUBSYSTEM ID | DISK TYPE | CAPACITY (GB) | RAID LEVEL | COST (¥) |
|---|---|---|---|---|---|---|
| 1 | 1000 | — | FC | 300 | RAID5 | 1333 |

C552　C553　C554　C555　C556　C557　C558

T560

RELOCATION-DISTINATION VOLUME

| LOGICAL ID | STORAGE SUBSYSTEM ID | EXTERNAL STORAGE SUBSYSTEM ID | DISK TYPE | CAPACITY (GB) | RAID LEVEL | COST (¥) |
|---|---|---|---|---|---|---|
| 15 | 1000 | 3000 | SATA | 300 | RAID5 | 666 |

C562　C563　C564　C565　C566　C567　C568

CANCEL (B580)　OK (B590)

FIG. 8

| STORAGE SUBSYSTEM MANAGEMENT TABLE ||||
|---|---|---|---|
| ID | STORAGE SUBSYSTEM ID | PACKAGE PRICE (¥) | TOTAL CAPACITY (GB) |
| 1 | 1000 | 10000000 | 10000 |
| 2 | 2000 | 4000000 | 3000 |
| 3 | 3000 | 2000000 | 3000 |
| C301 | C302 | C303 | C304 |

FIG. 15

T100 — DISK UNIT PRICE MANAGEMENT TABLE

| DISK ID | STORAGE SUBSYSTEM ID | DISK TYPE | DISK CAPACITY (GB) | DISK UNIT PRICE (¥) | USE START DATE |
|---|---|---|---|---|---|
| 1 | 1000 | FC | 100 | 100000 | 2005/01/01 10:00 |
| 2 | 2000 | FC | 100 | 80000 | 2002/06/01 10:00 |
| 3 | 3000 | SATA | 100 | 50000 | 2004/01/01 10:00 |
| C101 | C102 | C103 | C104 | C105 | C106 |

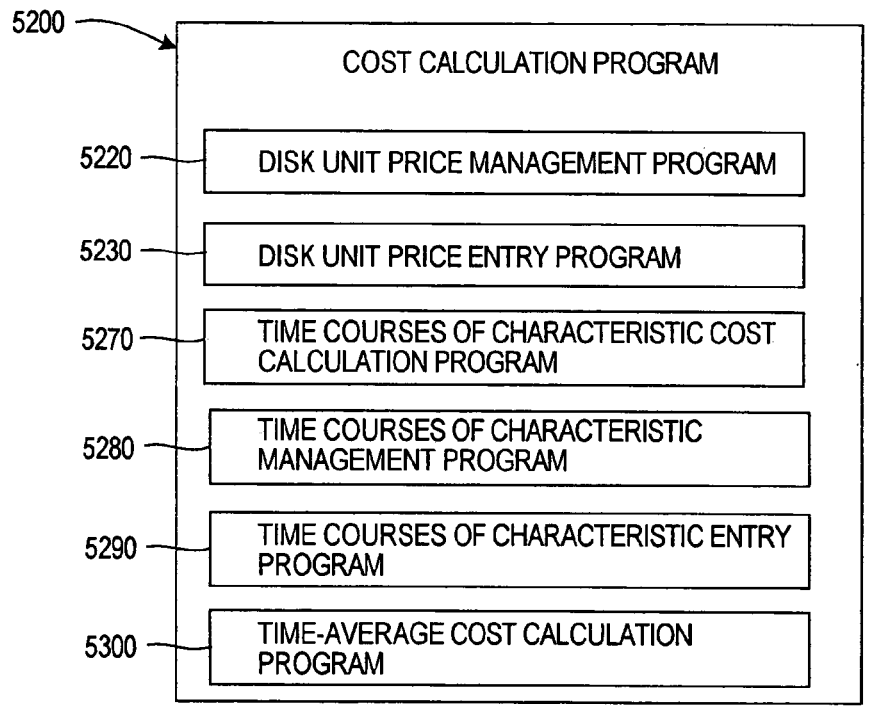

FIG. 16

5200 — COST CALCULATION PROGRAM
- 5220 — DISK UNIT PRICE MANAGEMENT PROGRAM
- 5230 — DISK UNIT PRICE ENTRY PROGRAM
- 5270 — TIME COURSES OF CHARACTERISTIC COST CALCULATION PROGRAM
- 5280 — TIME COURSES OF CHARACTERISTIC MANAGEMENT PROGRAM
- 5290 — TIME COURSES OF CHARACTERISTIC ENTRY PROGRAM
- 5300 — TIME-AVERAGE COST CALCULATION PROGRAM

CONSTRAINT MANAGEMENT TABLE T400

| ID | CONDITION NAME | COST UPPER LIMIT | COST LOWER LIMIT | SORTING ORDER | SUBSYSTEM ID | DISK TYPE | RAID LEVEL |
|---|---|---|---|---|---|---|---|
| 1 | CONSTRAINT 1 | NULL | NULL | ASCENDING ORDER | NULL | NULL | NULL |
| 2 | CONSTRAINT 2 | NULL | NULL | DESCENDING ORDER | NULL | NULL | NULL |
| 3 | CONSTRAINT 3 | 10000 | NULL | ASCENDING ORDER | NULL | NULL | NULL |
| 4 | CONSTRAINT 4 | NULL | 1000 | DESCENDING ORDER | NULL | NULL | NULL |
| 5 | CONSTRAINT 5 | 10000 | 1000 | ASCENDING ORDER | NULL | NULL | NULL |
| 6 | CONSTRAINT 6 | NULL | 1000 | ASCENDING ORDER | RELOCATION-SOURCE | RELOCATION-SOURCE | RELOCATION-SOURCE |
| 7 | CONSTRAINT 7 | 10000 | NULL | ASCENDING ORDER | RELOCATION-SOURCE | RELOCATION-SOURCE | RELOCATION-SOURCE |
| 8 | CONSTRAINT 8 | NULL | 1000 | ASCENDING ORDER | 1000 | FC | RAID5 |
| 9 | CONSTRAINT 9 | 10000 | 1000 | ASCENDING ORDER | 1000 | FC | RAID5 |
| 10 | CONSTRAINT 10 | 10000 | 1000 | ASCENDING ORDER | 3000 | SATA | RAID5 |
| C401 | C402 | C403 | C404 | C405 | C406 | C407 | C408 |

*FIG. 19*

CONSTRAINT DESIGNATION SCREEN — W450

| CONSTRAINT NAME | CONSTRAINT 7 |
|---|---|

COST CONSTRAINT — T450

| | |
|---|---|
| VOLUME COST UPPER LIMIT (¥) | 10000 |
| VOLUME COST LOWER LIMIT (¥) | 1000 |
| CANDIDATE LIST SORTING ORDER | ASCENDING ORDER ▽ |

- R452: VOLUME COST UPPER LIMIT
- R453: VOLUME COST LOWER LIMIT
- R454: CANDIDATE LIST SORTING ORDER

PHYSICAL CHARACTERISTIC CONSTRAINT — T470

- ⦿ SAME PHYSICAL CHARACTERISTIC AS RELOCATION-SOURCE (R475)
- ○ (R476)

| STORAGE SUBSYSTEM ID | 1000 ▽ |
|---|---|
| DISK TYPE | FC ▽ |
| RAID LEVEL | RAID5 ▽ |

[ CANCEL ] (B400)   [ OK ] (B410)

CONSTRAINT MANAGEMENT TABLE T400

| ID | CONDITION NAME | COST UPPER LIMIT | COST LOWER LIMIT | SORTING ORDER | SUBSYSTEM ID | DISK TYPE | RAID LEVEL | TARGET VOLUME |
|---|---|---|---|---|---|---|---|---|
| 1 | CONSTRAINT 1 | NULL | NULL | ASCENDING ORDER | NULL | NULL | NULL | NULL |
| 2 | CONSTRAINT 2 | NULL | NULL | DESCENDING ORDER | NULL | NULL | NULL | NULL |
| 3 | CONSTRAINT 3 | 10000 | NULL | ASCENDING ORDER | NULL | NULL | NULL | NULL |
| 4 | CONSTRAINT 4 | NULL | 1000 | DESCENDING ORDER | NULL | NULL | NULL | NULL |
| 5 | CONSTRAINT 5 | 10000 | 1000 | ASCENDING ORDER | NULL | NULL | NULL | NULL |
| 6 | CONSTRAINT 6 | NULL | NULL | ASCENDING ORDER | RELOCATION-SOURCE | RELOCATION-SOURCE | RELOCATION-SOURCE | NULL |
| 7 | CONSTRAINT 7 | 10000 | 1000 | ASCENDING ORDER | RELOCATION-SOURCE | RELOCATION-SOURCE | RELOCATION-SOURCE | NULL |
| 8 | CONSTRAINT 8 | NULL | 1000 | ASCENDING ORDER | 1000 | FC | RAID5 | NULL |
| 9 | CONSTRAINT 9 | 10000 | 1000 | ASCENDING ORDER | 1000 | FC | RAID5 | NULL |
| 10 | CONSTRAINT 10 | 10000 | 1000 | ASCENDING ORDER | 3000 | SATA | RAID5 | 1 |
| C401 | C402 | C403 | C404 | C405 | C406 | C407 | C408 | C409 |

INTER-VOLUME MIGRATION SYSTEM, INTER-VOLUME RELOCATION METHOD, AND PROGRAM THEREFOR

CLAIM OF PRIORITY

The present application claims priority from Japanese patent application P2005-124762 filed on Apr. 22, 2005, the content of which is hereby incorporated by reference into this application.

BACKGROUND

This invention relates to an inter-volume migration system for relocation between volumes, and more particularly to a technique for selection of a relocation-destination volume.

The inter-volume migration system includes a storage subsystem having at least one or more volumes. When the storage subsystem has a plurality of volumes, the volumes may have the same physical characteristics, or may differ in physical characteristics. Alternatively, the storage subsystem may have only one volume having the same physical characteristics, or may have a plurality of volumes having the same physical characteristics.

The inter-volume migration system allows data area relocation between the volumes within the storage subsystem. To be specific, the inter-volume migration system causes data area to be relocated from a volume designated as a relocation source (relocation-source volume) to a volume designated as a relocation destination (relocation-destination volume).

For example, JP 2001-67187 A discloses a storage subsystem capable of facilitating the work of optimizing location due to physical relocation of a storage area by the user of the storage subsystem.

For example, JP 2004-295457 A discloses a technique of optimizing data location based on a life cycle of data and a data type.

SUMMARY

In the conventional techniques as described above, the storage subsystem selects the relocation-destination volume based on the physical characteristic of a volume.

However, the selection of the relocation-destination volume by the storage subsystem is made regardless of a volume cost. Therefore, it is impossible to migrate data between volumes from a cost viewpoint.

This invention has been made in view of the above-mentioned problem, and it is therefore an object of this invention to provide an inter-volume migration system capable of selecting a relocation-destination volume in consideration of a volume cost.

According to an embodiment of this invention, there is provided an inter-volume migration system including: a storage subsystem having one or more volumes; an inter-volume relocation instruction module that relocates a relocation-source volume to a relocation-destination volume for copy data stored in the relocation-source volume; a cost calculation module that calculates a cost value of a volume; and a volume selection module that selects a candidate for the relocation-destination volume based on the cost value of the volume calculated by the cost calculation module and constraints imposed on the relocation-destination volume.

According to this invention, it is possible to relocate a data area between volumes in consideration of a volume cost.

BRIEF DESCRIPTION OF THE DRAWINGS

The present invention can be appreciated by the description which follows in conjunction with the following figures, wherein:

FIG. 3 shows a structure of a disk unit price management table managed with a disk unit price management program according to the first embodiment of this invention;

FIG. 4 shows a structure of a volume management table managed with a storage management program according to the first embodiment of this invention;

FIG. 5 illustrates a disk price unit entry screen displayed on an output unit according to the first embodiment of this invention;

FIG. 6 illustrates a constraint designation screen displayed on the output unit according to the first embodiment of this invention;

FIG. 7 illustrates a relocation-destination volume selection screen displayed on the output unit according to the first embodiment of this invention;

FIG. 8 illustrates a relocation-destination volume confirmation screen displayed on the output unit according to the first embodiment of this invention;

FIG. 15 shows a structure of a disk unit price management table managed with a disk unit price management program according to the third embodiment of this invention;

FIG. 16 is a block diagram of the cost calculation program according to a fourth embodiment of this invention;

FIG. 19 shows a structure of a constraint management table managed with the constraint management program according to the sixth embodiment of this invention;

FIG. 20 illustrates the constraint designation screen displayed on the output unit according to the sixth embodiment of this invention;

FIG. 22 shows a structure of the constraint management table managed with the constraint management program according to the seventh embodiment of this invention.

DETAILED DESCRIPTION OF THE PREFERRED EMBODIMENTS

Hereinafter, embodiments of this invention will be described with reference to the accompanying drawings.

First Embodiment

Figure 1:
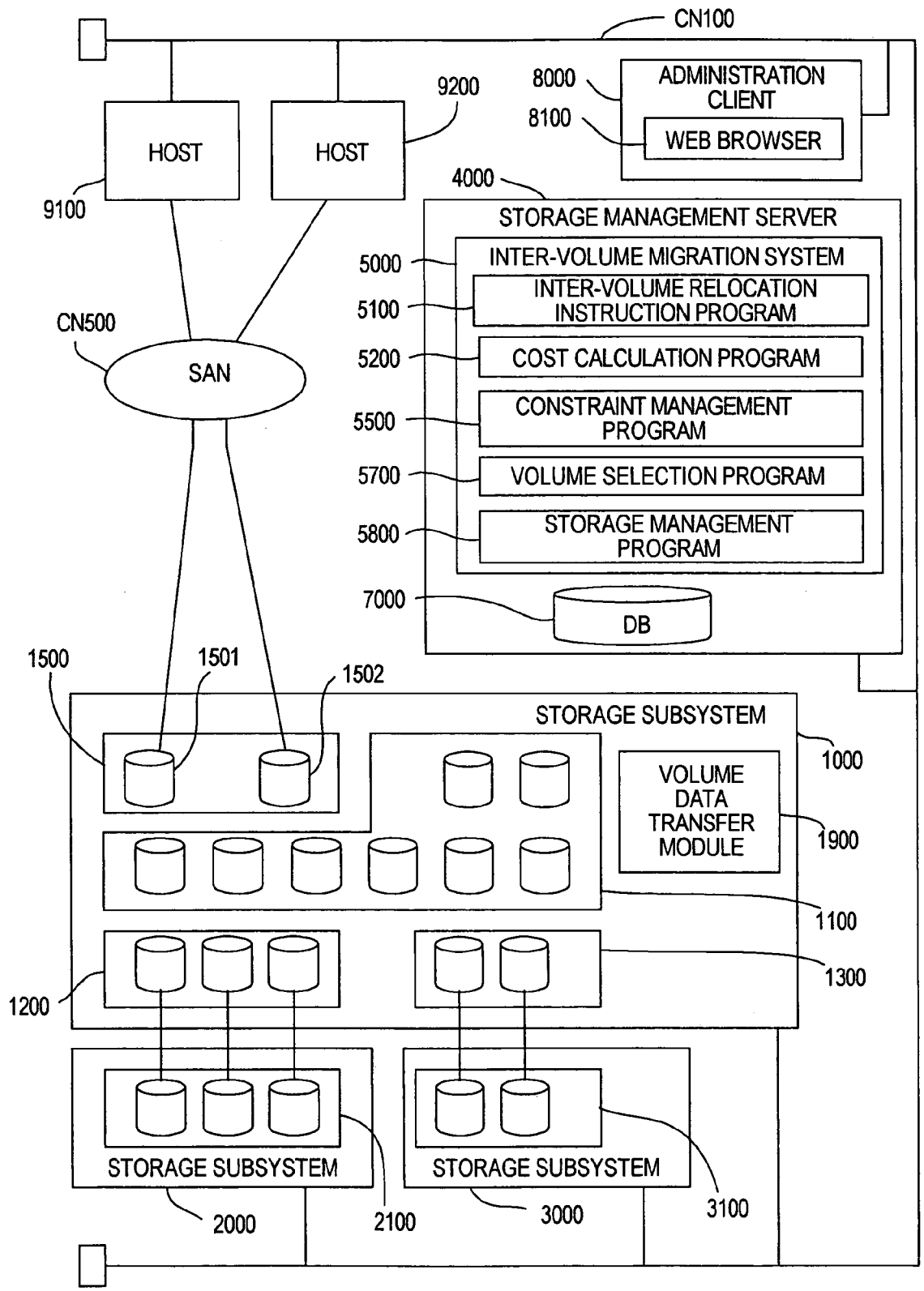
FIG. 1 is a block diagram showing a configuration of an information management system according to a first embodiment of this invention.

FIG. 1 is a block diagram showing the configuration of an information management system according to a first embodiment of this invention.

The information management system includes storage subsystems 1000, 2000, and 3000, hosts 9100 and 9200, a storage management server 4000, and an administration client 8000.

The storage subsystem 1000 includes a disk controller (not shown) and volumes. The disk controller controls data input/output to/from the volumes. The volumes include an in-use volume 1500 and an unused volume 1100. The in-use volume 1500 includes volumes 1501 and 1502 used by the hosts 9100 and 9200.

The storage subsystem 2000 includes a disk controller (not shown) and a volume 2100. The storage subsystem 3000 includes a disk controller (not shown) and a volume 3100 likewise.

The storage subsystem 1000 is connected with the storage subsystems 2000 and 3000 via a communication network using an FC (Fibre Channel).

The storage subsystem 1000 collectively manages the volume 2100 in the storage subsystem 2000 and the volume 3100 in the storage subsystem 3000 together with its own volumes 1100 and 1500.

In short, the storage subsystem 1000 manages the volume 2100 in the storage subsystem 2000 like its own volume 1200. In addition, the storage subsystem 1000 manages the volume 3100 in the storage subsystem 3000 like its own volume 1300.

The hosts 9100 and 9200 are connected with the disk controller of the storage subsystem 1000 through a communication network CN 500 using the FC (Fibre Channel), for example. The hosts 9100 and 9200 access the volumes 1501 and 1502 of the storage subsystem 1000.

The storage management server 4000 is connected with the storage subsystems 1000, 2000, and 3000, the hosts 9100 and 9200, and the administration client 8000 via a communication network CN 100 such as a LAN.

As will be detailed with reference to FIG. 2, the storage management server 4000 includes an inter-volume migration system 5000 and a database (DB) 7000. The storage management server 4000 manages the storage subsystems 1000, 2000, and 3000.

The inter-volume migration system 5000 manages the inter-volume migration in the storage subsystems 1000, 2000, and 3000 connected with the storage management server 4000.

In the first embodiment, the storage subsystem 1000 manages the volume 2100 in the storage subsystem 2000 and the volume 3100 in the volume subsystem 3000. Therefore, the inter-volume migration system 5000 needs only to manage the migration of the volumes 1100, 1200, 1300, and 1500 collectively managed by the storage subsystem 1000.

The inter-volume migration system 5000 is implemented by using an inter-volume relocation instruction program 5100, a cost calculation program 5200, a constraint management program 5500, a volume selection program 5700, a storage management program 5800, and the like.

The inter-volume relocation instruction program 5100 causes the system to instruct (instructs) a volume data transfer module 1900 of the storage subsystem 1000 to execute relocation of a data area. More specifically, the inter-volume relocation instruction program 5100 issues an instruction to execute relocation of a data area from a relocation-source volume to a relocation-destination volume. Here, the relocation-source volume is a volume designated by a user etc. as a relocation source, while the relocation-destination volume is a volume selected as a relocation destination using the volume selection program 5700.

The cost calculation program 5200 calculates a cost of a volume. It should be noted that the volume cost implies a volume price per unit capacity, for example.

The constraint management program 5500 manages conditions (constraints) under which the volume selection program 5700 selects a volume. The constraints include a cost constraint and an indispensable constraint.

The cost constraint means a condition on a volume cost, for example, an upper limit or lower limit of the volume cost.

The indispensable constraint means a condition that should be satisfied in order to execute relocation of a data area between volumes. For example, the indispensable constraint defines that a selected-volume size should be larger than a relocation-source volume size and the selected volume should be unused. Here, the indispensable constraint conforms to specifications of an information processing system and is thus not limited to the above.

The volume selection program 5700 selects a volume satisfying the constraints. The storage management program 5800 manages the storage subsystems 1000, 2000, and 3000 connected with the storage management server 4000.

The database 7000 stores data necessary for the storage management server 4000 to manage the storage subsystems 1000, 2000, and 3000. For example, the database 7000 stores a disk unit price management table of FIG. 3 and a volume management table of FIG. 4.

The administration client 8000 is a computer including a CPU, a memory, and an input/output unit (not shown). The administration client 8000 includes a web browser 8100.

The web browser 8100 sends information inputted by a user to the storage management server 4000. In addition, the web browser 8100 outputs information received from the storage management server 4000.

In the first embodiment, the storage subsystem 1000 includes the volume data transfer module 1900. Here, the volume data transfer module 1900 may be provided anywhere on a path from the hosts 9100 and 9200 to the storage subsystem 1000. For example, the volume data transfer module 1900 may be provided to the hosts 9100 and 9200 or a switch on the communication network CN 500.

The volume data transfer module 1900 transfers data from a relocation-source volume to a relocation-destination volume in response to an instruction from the inter-volume relocation instruction program 5100 of the inter-volume migration system 5000.

Figure 2:
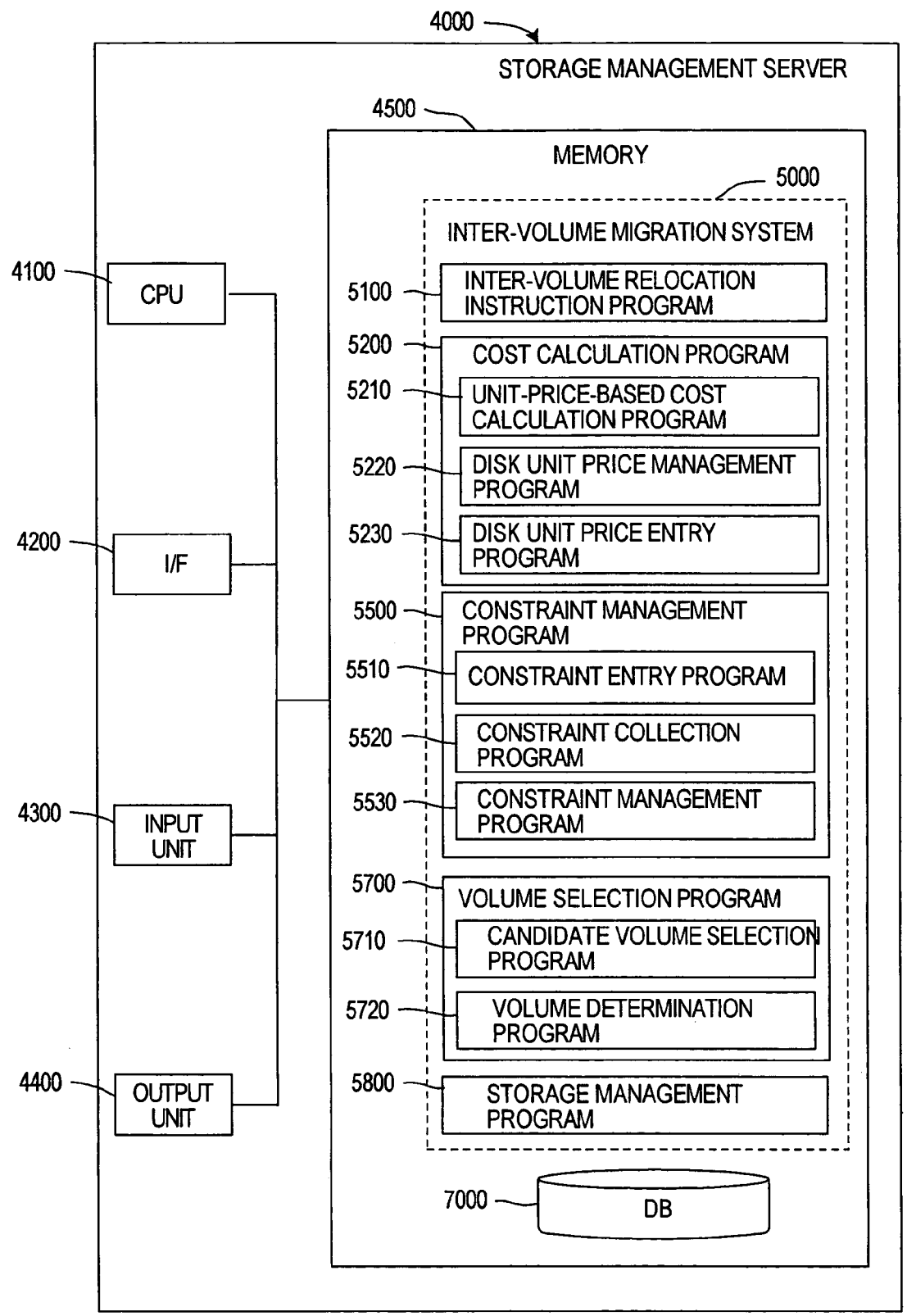
FIG. 2 is a block diagram showing a storage management server according to the first embodiment of this invention.

FIG. 2 is a block diagram of the storage management server 4000 according to the first embodiment of this invention.

The storage management server 4000 includes a CPU 4100, an interface (I/F) 4200, an input unit 4300, an output unit 4400, and a memory 4500.

The CPU 4100 executes a program stored in the memory 4500 to carry out various processings.

The interface 4200 is connected with the storage subsystems 1000, 2000, and 3000, the hosts 9100 and 9200, and the administration client 8000 via a communication network CN 100.

The input unit 4300 is, for example, a keyboard to which a user inputs various kinds of information. The output unit 4400 is, for example, a liquid crystal display from which various kinds of information are outputted.

The memory 4500 stores the inter-volume relocation instruction program 5100, the cost calculation program 5200, the constraint management program 5500, the volume selection program 5700, the storage management program 5800, and the database 7000.

The database 7000 stores data necessary for the storage management server 4000 to manage the storage subsystems 1000, 2000, and 3000. In addition, the database 7000 stores the disk unit price management table of FIG. 3 and the volume management table of FIG. 4.

The inter-volume migration system 5000 is implemented by using the inter-volume relocation instruction program 5100, the cost calculation program 5200, the constraint management program 5500, the volume selection program 5700, and the storage management program 5800.

The inter-volume relocation instruction program 5100 instructs the volume data transfer module 1900 of the storage subsystem 1000 to execute relocation between volumes.

The cost calculation program 5200 includes a unit-price-based cost calculation program 5210, a disk unit price management program 5220, and a disk unit price entry program 5230, and calculates a volume cost.

The unit-price-based cost calculation program 5210 calculates a volume cost based on a unit price of a physical disk constituting a volume, and a physical configuration of the volume. In this connection, the physical configuration of the volume refers to a RAID (Redundant Array of Independent Disks) configuration.

To be specific, the unit-price-based cost calculation program 5210 calculates a proportion of an area that can actually store data (for example, an area excluding a parity-data-recorded area in RAID5) to the total physical storage area based on the RAID configuration. The unit-price-based cost calculation program 5210 calculates a volume cost based on the determined proportion of the area and a physical disk unit price. It will be detailed later with reference to a flowchart of FIG. 9 how to calculate a volume cost.

The disk unit price management program 5220 manages the disk unit price management table of FIG. 3, which is stored in the database 7000, thereby managing the unit price of the physical disk constituting the volume.

The disk unit price entry program 5230 stores information about a physical disk unit price inputted with the input unit 4300, in the disk unit price management table of FIG. 3, which is stored in the database 7000.

The constraint management program 5500 includes a constraint entry program 5510, a constraint collection program 5520, and a constraint management program 5530.

The constraint entry program 5510 issues a request to designate constraints through the output unit 4400. After that, the constraint entry program 5510 collects the constraints inputted with the input unit 4300.

The constraint collection program 5520 collects indispensable constraints based on physical characteristics of a relocation-source volume.

The constraint management program 5530 manages the constraints collected using the constraint entry program 5510 and the constraint collection program 5520.

The volume selection program 5700 includes a candidate volume selection program 5710 and a volume determination program 5720, and selects a volume satisfying constraints.

The candidate volume selection program 5710 selects a volume (candidate volume) as a candidate for a relocation-destination volume based on a volume cost calculated with the cost calculation program 5200 and constraints managed with the constraint management program 5500.

When the candidate volume selection program 5710 selects plural candidate volumes, the volume determination program 5720 outputs a list of the candidate volumes through the output unit 4400. The volume determination program 5720 requests a user to instruct a relocation-destination volume based on the list. The volume determination program 5720 then determines a candidate volume designated by the user as a relocation-destination volume.

The storage management program 5800 manages the storage subsystems 1000, 2000, and 3000 connected with the storage management server 4000.

FIG. 3 is a structural diagram of a disk unit price management table T100 managed with the disk unit price management program 5220 according to the first embodiment of this invention.

The disk unit price management table T100 lists a disk ID (C101), a storage subsystem ID (C102), a disk type C103, a disk capacity C104, and a disk unit price C105.

The disk ID (C101) is a unique identifier of each disk constituting the storage subsystem 1000, 2000, or 3000. The storage subsystem ID (C102) is a unique identifier of the storage subsystem 1000, 2000, or 3000 composed of the disk.

The disk type C103 represents a type of the disk. For example, "SATA" or "FC" is set as the disk type. It should be noted that the storage subsystems 1000, 2000, and 3000 may be composed of different types of disks.

The disk capacity C104 represents a storage capacity of the disk, and is represented in gigabytes (GB), for example. The disk unit price C105 represents a unit price of the disk, and is represented in yen (¥), for example.

Here, the disk unit price management table T100 illustrated in FIG. 3 manages a disk unit price for each of the storage subsystems 1000, 2000, and 3000. However, the disk unit price management table T100 can manage a disk unit price either for each volume or for each disk type.

FIG. 4 is a structural diagram of a volume management table T200 managed with the storage management program 5800 according to the first embodiment of this invention.

The volume management table T200 lists a logical ID (C201), a storage subsystem ID (C202), an external storage subsystem ID (C203), a disk type C204, a capacity C205, a RAID level C206, and a usage status C207.

The logical ID (C201) represents a unique identifier of each of the volumes 1100, 1200, 1300, and 1500. The storage subsystem ID (C202) represents, for example, a unique identifier of the storage subsystem 1000 for managing the volume 1100.

When the volume is outside the storage subsystem 1000, a unique identifier of the storage subsystem 2000 or 3000 to which the volume belongs is set as the external storage subsystem ID (C203). In addition, is set as the external storage subsystem ID (C203) when the volume belongs to the storage subsystem 1000.

The disk type C204 represents a type of a disk constituting the volume. The capacity C205 represents a capacity of the volume, and is represented in gigabytes (GB), for example. The RAID level C206 represents a RAID attribute of the volume, and "RAID1" or "RAID5" is set, for example.

The usage status C207 indicates whether or not the volume is being used. For example, when any data has been written to the volume, "in use" is set as the usage status C207. In contrast, when no data has been written to the volume, "unused" is set as the usage status C207.

FIG. 5 illustrates a disk unit price entry screen W150 displayed on the output unit 4400 according to the first embodiment of this invention.

The disk unit price entry program 5230 instructs, when updating the disk unit price management table T100, the output unit 4400 to display the disk unit price entry screen W150.

The disk unit price entry screen W150 includes the disk unit price entry table T150, a cancel button B100, and an OK button B200.

The disk unit price entry table T150 lists a storage subsystem ID entry field R152, a disk type entry field R153, a disk capacity entry field R154, and a disk unit price entry field R155. In the entry fields R152 to R155, a user enters information about a disk registered in the disk unit price management table T100.

Entered in the storage subsystem ID entry field R152 is a unique identifier of the storage subsystem 1000, 2000, or 3000 composed of the disk.

Entered in the disk type entry field R153 is a type of the disk. Entered in the disk capacity entry field R154 is a storage capacity of the disk. Entered in the disk unit price entry field R155 is a unit price of the disk.

As the cancel button B100 is clicked, the disk unit price entry program 5230 cancels updating of the disk unit price management table T100.

As the OK button B200 is clicked, the disk unit price entry program 5230 updates the disk unit price management table T100 based on information entered in the disk unit price entry table T150 of the disk unit price entry screen W150.

To be specific, the disk unit price entry program 5230 adds a new record to the disk unit price management table T100. Next, a value different from that of a disk ID (C101) of another record is set as a disk ID (C101) in the additional record.

Next, a value entered in the storage subsystem ID entry field R152 of the disk unit price entry table T150 is set as a storage subsystem ID (C102) in the additional record. Next, information entered in the disk type entry field R153 is set as a disk type C103 in the additional record.

Subsequently, a value entered to the disk capacity entry field R154 of the disk unit price entry table T150 is set as a disk capacity C104 in the additional record. Then, a value entered to the disk unit price entry field R155 of the disk unit price entry table T150 is set as a disk unit price C105 in the additional record.

The disk unit price entry program 5230 updates the disk unit price management table T100 in the above manner.

FIG. 6 illustrates a constraint designation screen W450 displayed on the output unit 4400 according to the first embodiment of this invention, The constraint entry program 5510 instructs the output unit 4400 to display the constraint designation screen W450 when requesting a user to designate a constraint. The constraint designation screen W450 includes a cost constraint table T450, a cancel button B400, and an OK button B410.

The cost constraint table T450 includes a volume cost upper limit entry field R452, a volume cost lower limit entry field R453, and a candidate list sorting order entry field R454. A user enters information about constraints to the entry fields R452 to R454.

Entered in the volume cost upper limit entry field R452 is a cost upper limit of a volume selected with the candidate volume selection program 5710. It should be noted that when no value is entered to the volume cost upper limit entry field R452, the constraint entry program 5510 judges that the volume cost upper limit is not designated.

Entered in the volume cost lower limit entry field R453 is a cost lower limit of a volume selected with the candidate volume selection program 5710. It should be noted that when no value is entered to the volume cost lower limit entry field R453, the constraint entry program 5510 judges that the volume cost lower limit is not designated.

Entered in the candidate list sorting order entry field R454 is a display order in which the output unit 4400 displays candidate volumes selected with the candidate volume selection program 5710. For example, an "ascending order" is set, the output unit 4400 displays a list of the candidate volumes in the order of volume cost from lowest to highest. In contrast, a "descending order" is set, the output unit 4400 displays a list of candidate volumes in the order of volume cost from highest to lowest.

Here, the cost constraint table T450 may include an entry field for designating one of a relocation-destination volume cost higher than a relocation-source volume cost and a relocation-destination cost lower than the same. With the settings, the inter-volume migration system 5000 can migrate information whose value is deteriorated to a low-cost volume with ease.

When the cancel button B400 is clicked, the constraint entry program 5510 cancels entering the constraints.

When the OK button B410 is clicked, the constraint entry program 5510 sets information entered to the cost constraint table T450 as constraints.

FIG. 7 illustrates a relocation-destination volume selection screen W500 displayed on the output unit 4400 according to the first embodiment of this invention.

When the candidate volume selection program 5710 selects plural candidate volumes, the volume determination program 5720 instructs the output unit 4400 to display the relocation-destination volume selection screen W500.

The relocation-destination volume selection screen W500 includes a candidate volume list T500, a cancel button B510, and an OK button B520.

The candidate volume list T500 includes a selection check box C501, a logical ID (C502), a storage subsystem ID (C503), an external storage subsystem ID (C504), a disk type C505, a capacity C506, a RAID level C507, and a cost C508.

The selection check box C501 indicates whether or not the volume is being selected. A user checks a selection check box C501 in a corresponding record to thereby select a desired relocation-destination volume from among the candidate volumes.

The logical ID (C502) is a unique identifier of a volume. The storage subsystem ID (C503) is a unique identifier of the storage subsystem 1000 that manages the volume.

When the volume is outside the storage subsystem 1000, a unique identifier of the storage subsystem 2000 or 3000 to which the volume belongs is set as the external storage subsystem ID (C504). In addition, "–" is set as the external storage subsystem ID (C504) when the volume belongs to the storage subsystem 1000.

The disk type C505 represents a type of a disk constituting the volume. The capacity C506 represents a capacity of the volume, and is represented in gigabytes (GB), for example. The RAID level C507 represents a RAID attribute of the volume, and "RAID1" or "RAID5" is set, for example.

The cost C508 represents a cost of the volume, and is calculated with the cost calculation program 5200.

A user can select a relocation-destination volume from a cost viewpoint because the candidate volume list T500 includes the cost C508.

When the cancel button B510 is clicked, the volume determination program 5720 cancels determination of a relocation-destination volume.

When the OK button B520 is clicked, the volume determination program 5720 determines a candidate volume in a checkmarked record in the selection check box C501, as a relocation-destination volume.

FIG. 8 illustrates a relocation-destination volume confirmation screen W550 displayed on the output unit 4400 according to the first embodiment of this invention.

After determining a relocation-destination volume, the volume determination program 5720 instructs the output unit 4400 to display the relocation-destination volume confirmation screen W550.

The relocation-destination volume confirmation screen W550 includes a relocation-source volume table T550, a relocation-destination volume table T560, a cancel button B580, and an OK button B590.

The relocation-source volume table T550 lists information about a relocation-source volume. The relocation-source volume table T550 lists a logical ID (C552), a storage subsystem ID (C553), an external storage subsystem ID (C554), a disk type C555, a capacity C556, a RAID level C557, and a cost C558.

The logical ID (C552) is a unique identifier of a volume as a relocation-source volume. The storage subsystem ID (C553) is a unique identifier of the storage subsystem 1000 that manages the volume.

When the volume is outside the storage subsystem 1000, a unique identifier of the storage subsystem 2000 or 3000 to which the volume belongs is set as the external storage subsystem ID (C554). In addition, "–" is set as the external storage subsystem ID (C554) when the volume belongs to the storage subsystem 1000.

The disk type C555 represents a type of a disk constituting the volume. The capacity C556 represents a capacity of the volume, and is represented in gigabytes (GB), for example. The RAID level C557 represents a RAID attribute of the volume.

The cost C558 represents a cost of the volume, and is calculated with the cost calculation program 5200.

The relocation-destination volume table T560 lists information about a relocation-destination volume. The relocation-destination volume table T560 lists a logical ID (C562), a storage subsystem ID (C563), an external storage subsystem ID (C564), a disk type C565, a capacity C566, a RAID level C567, and a cost C568.

The logical ID (C562) is a unique identifier of a volume as a relocation-destination volume. The storage subsystem ID (C563) is a unique identifier of the storage subsystem 1000 that manages the volume.

When the volume is outside the storage subsystem 1000, a unique identifier of the storage subsystem 2000 or 3000 to which the volume belongs is set as the external storage subsystem ID (C564). In addition, is set as the external storage subsystem ID (C564) when the volume belongs to the storage subsystem 1000.

The disk type C565 represents a type of a disk constituting the volume. The capacity C566 represents a capacity of the volume, and is represented in gigabytes (GB), for example. The RAID level C567 represents a RAID attribute of the volume.

The cost C568 represents a cost of the volume, and is calculated with the cost calculation program 5200.

When the cancel button B580 is clicked, the volume determination program 5720 then cancels determination of a relocation-destination volume.

A user references the relocation-source volume table T550 and relocation-destination volume table T560 on the relocation-destination volume confirmation screen W550 to confirm contents of the screen regarding the inter-volume migration or cancel confirmation. Confirming the contents, the user clicks the OK button B590.

When the OK button B590 is clicked, the volume determination program 5720 determines a candidate volume designated by the user, as a relocation-destination volume.

Figure 9:
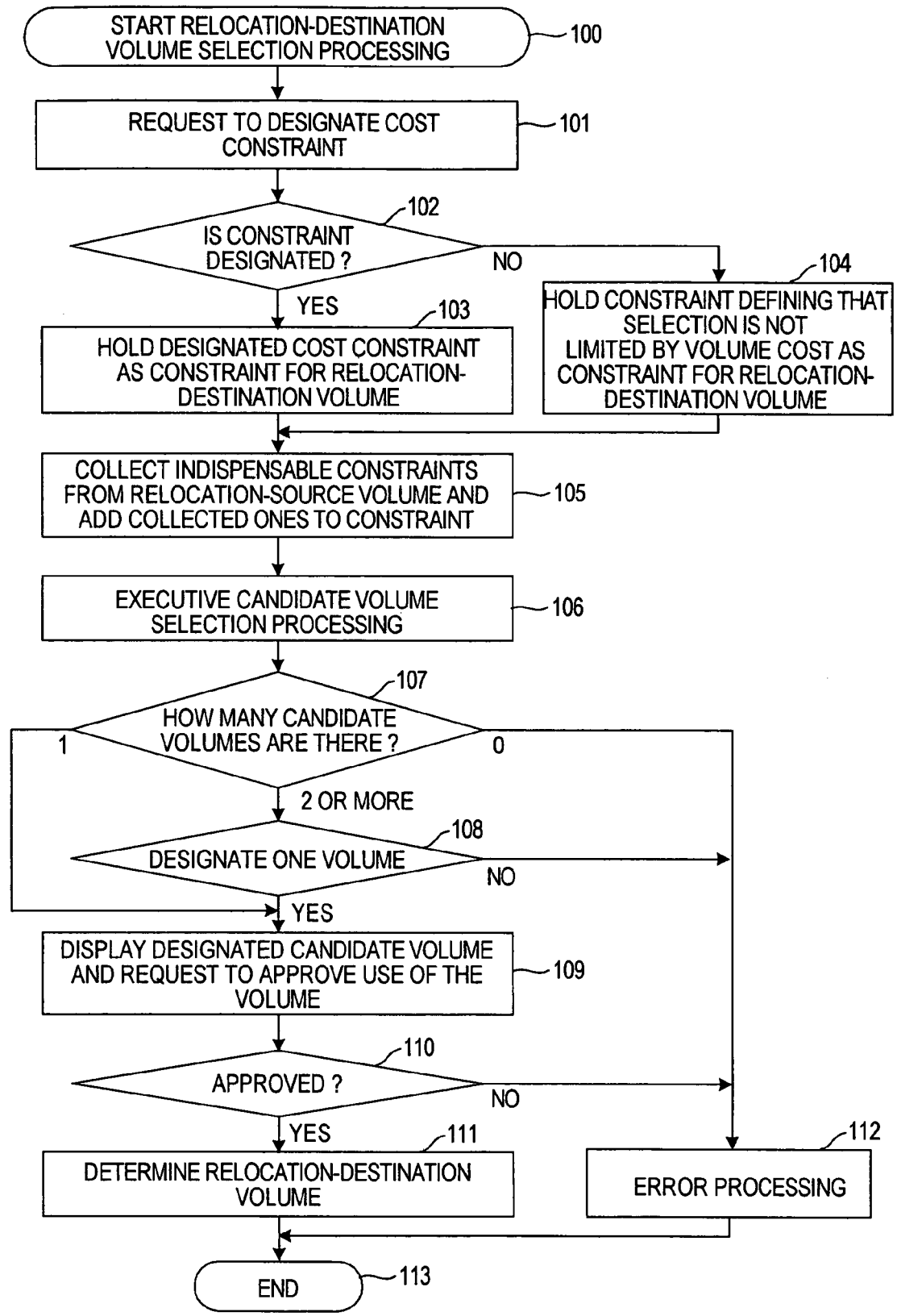
FIG. 9 is a flowchart of a relocation-destination volume selection processing executed by an inter-volume migration system according to the first embodiment of this invention.

FIG. 9 is a flowchart of a relocation-destination volume selection processing executed by the inter-volume migration system 5000 according to the first embodiment of this invention.

The user requests the inter-volume migration system 5000 to migrate data between volumes. Here, the request is also targeted for designation of the relocation-source volume.

The inter-volume migration system 5000 starts the relocation-destination volume selection processing (100) in response to an inter-volume relocation request from a user.

First, the system requests a user to designate a cost constraint for a relocation-destination volume (101), more specifically, instructs the output unit 4400 to display the constraint designation screen W450 of FIG. 6.

Next, the system judges whether or not the user designates a cost constraint (102). To elaborate, provided that a value is entered to at least one of the volume cost upper limit entry field R452 and volume cost lower limit entry field R453 of the cost constraint table T450 in the constraint designation screen W450, the system judges that the user has designated the cost constraint.

In the case where the user has designated a cost constraint, the designated constraint is held as a constraint for the relocation-destination volume (103).

In contrast, in the case where the user has not designated a cost constraint, held as a constraint for a relocation-destination volume is the condition that the volume selection is not limited by a cost (104). Assuming here that an "ascending order" is entered in the candidate list sorting order entry field R452 of the cost constraint table T450, the output unit 4400 can display the candidate volumes in the order of volume cost from lowest to highest. With the settings, the user can select a relocation-destination volume from among the candidate volumes, from a cost viewpoint with ease.

The step 103 or 104 causes the inter-volume migration system 5000 to hold the constraint regardless of whether or not a cost constraint has been designated.

Next, the inter-volume migration system 5000 collects indispensable constraints from physical characteristics of a relocation-source volume. The indispensable constraints exclusively include conditions as disable execution of inter-volume relocation unless being satisfied. The collected indispensable constraints are added to the constraints (105).

Figure 10:
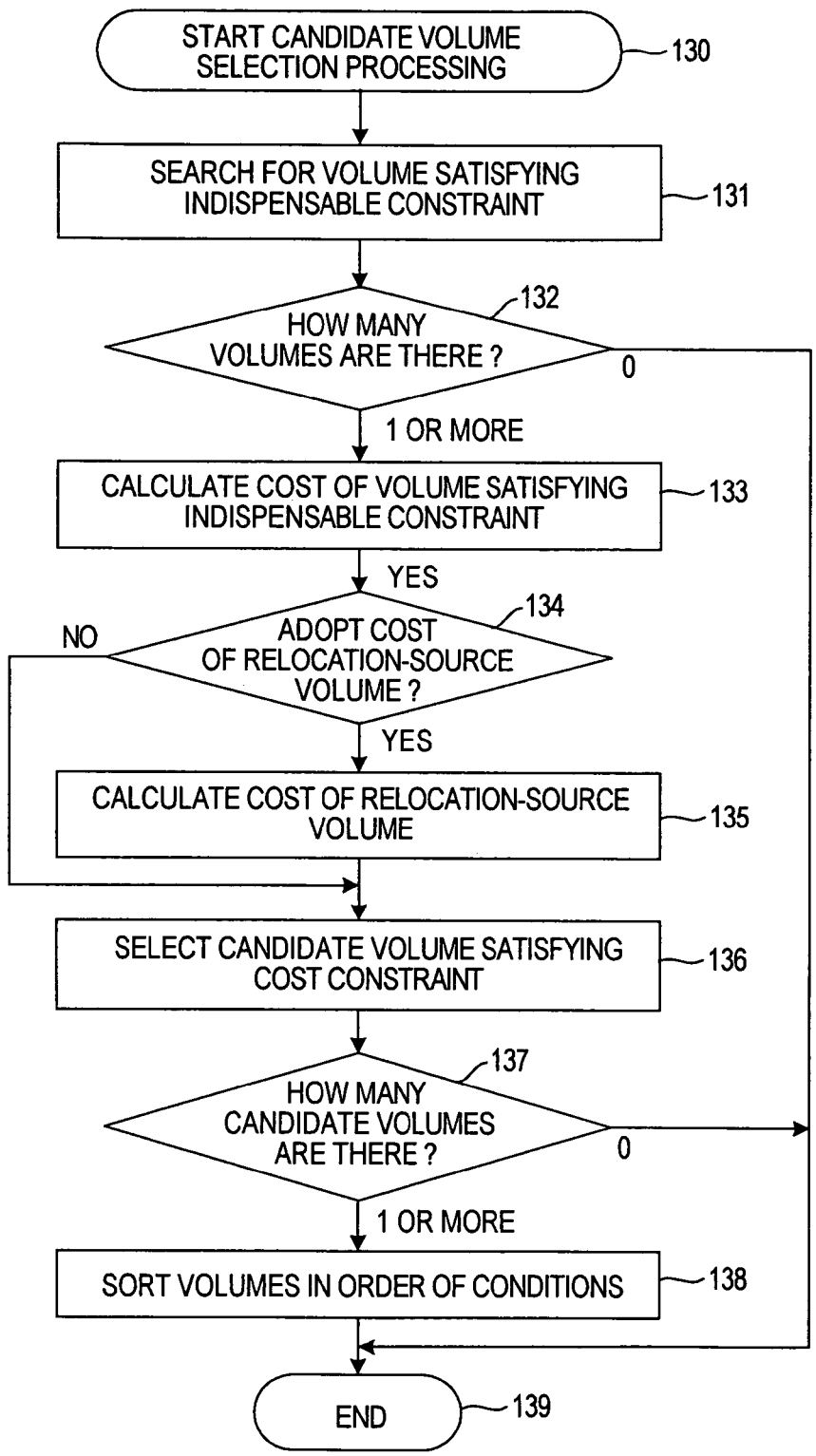
FIG. 10 is a flowchart of a candidate volume selection processing executed by the inter-volume migration system according to the first embodiment of this invention.

Subsequently, the candidate volume selection processing (106) is executed to select a volume (candidate volume) satisfying the constraints. Referring to FIG. 10 later, the candidate volume selection processing (106) will be described.

Next, the system calculates the number of selected candidate volumes (107).

When no candidate volume is found, it is impossible to select a relocation-destination volume and therefore, error processing is executed (112). For example, the error processing causes the output unit 4400 to display an error message, ending the processing (113).

In contrast, when one candidate volume is selected, the process directly proceeds to a step 109.

When two or more candidate volumes are selected, it is necessary to determine one of the candidate volumes as a relocation-destination volume. To that end, the system requests a user to designate a relocation-destination volume.

To be specific, the system instructs the output unit 4400 to display the relocation-destination volume selection screen W500 of FIG. 7. Then, a user designates one of the candidate volumes. When a desired candidate volume cannot be found, the user clicks the cancel button B520.

The inter-volume migration system 5000 judges whether or not the user has designated one of the candidate volumes (108).

In the case where no candidate volume has been designated (cancel button B520 has been clicked), the system judges that there is no volume adequate for a relocation-destination volume to execute error processing (112), thereby ending the processing (113).

In contrast, in the case where a candidate volume has been designated, the system requests a user to approve the use of the designated candidate volume (109).

To elaborate, the system instructs the output unit 4400 to display the relocation-destination volume confirmation screen W550 of FIG. 8. A user clicks the OK button B590 when approving the use thereof, and clicks the cancel button B580 otherwise.

Next, the inter-volume migration system 5000 judges whether or not the user has approved the use of the designated candidate volume.

In the case where the user has not approved the use of the candidate volume, the system judges that there is no volume adequate for a relocation-destination volume to execute error processing (112), thereby ending the processing (113).

In contrast, in the case where the user has approved the use of the candidate volume, the system determines the candidate volume as a relocation-destination volume (111) and then ends the processing (113).

FIG. 10 is a flowchart of the candidate volume selection processing 106 executed by the inter-volume migration system 5000 according to the first embodiment of this invention.

The inter-volume migration system 5000 adds indispensable constraints to the constraints (105) and then starts the candidate volume selection processing (130).

First, the volumes 1100, 1200, 1300, and 1500 of the storage subsystem 1000 are searched for a volume satisfying the constraints except the cost constraint. In the first embodiment, a volume satisfying indispensable constraints in the constraints is searched for (131).

Next, the system calculates the number of retrieved volumes as satisfy the indispensable constraints, and judges whether or not there are one or more volumes satisfying the indispensable constraints (132).

When there is no volume satisfying the indispensable constraints, it is impossible to select a candidate volume, and thus the processing is immediately ended (139).

In contrast, when there are one or more volumes satisfying the indispensable constraints, the system calculates costs for the volumes satisfying the indispensable constraints (133).

To elaborate, a cost "C0" of such a volume is derived from the following expression (1):

$$C0 = P0/V0 * D2/D1 \quad (1)$$

where D1 represents the number of disk drives engaging in date writing/reading in a RAID disk (i.e., disk drives except disk drives for parity check), D2 represents the number of disk drives constituting the RAID disk, P0 represents a unit price of a physical disk constituting the volume, and V0 represents a capacity of the physical disk constituting the volume.

For example, an explanation will be given taking as an example, a cost of a volume whose logical ID is "1".

First, the inter-volume migration system 5000 selects a record where a logical ID of a volume whose cost is to be calculated matches a logical ID (C201) of the volume management table T200 of FIG. 4. Next, a "RAID5" set as the RAID level C206 is extracted from the selected record. Then, "D1" and "D2" are calculated based on the extracted RAID level (RAID level C206). In the first embodiment, the "RAID5" is composed of four disks, three of which store data. Therefore, D1 and D2 are calculated to be 3 and 4, respectively based on the extracted "RAID5" as the RAID level C206.

Next, "1000" of the storage subsystem ID (C202) is extracted from the selected record. Then, a record is selected, where the extracted value, "1000" of the storage subsystem ID (C202) matches a storage subsystem ID (C102) in the disk unit price management table T100 of FIG. 3. Subsequently, "100" of the disk capacity C104 and "100000" of the disk unit price C105 are extracted from the selected record. After that, the extracted value, "100" of the disk capacity C104 is defined as "V0" and the extracted value, "100000" of the disk unit price C105 is defined as "P0".

Substituting all the variables into the expression gives a cost of the volume. To elaborate, a cost "C0" of a volume whose logical ID is "1" is derived from the following expression (2):

$$C0 = (100000)/(100) * (4)/(3) = 1333 \quad (2)$$

The inter-volume migration system 5000 calculates the cost of the volume in the above manner.

Next, the system judges whether or not a cost constraint in the constraints stipulates the use of a cost of a relocation-source volume (134).

In the case of using a cost constraint not stipulating the use of the cost of the relocation-source volume, there is no need to calculate the cost of the relocation-source volume, so the process directly proceeds to a step 136.

In contrast, in the case of using the cost constraint stipulating the use of the cost of the relocation-source volume, the cost of the relocation-source volume is calculated (135). To be specific, the cost is derived from the above expression (1).

Then, a volume is selected from among retrieved volumes satisfying indispensable constraints, which satisfies a cost constraint in the constraints (136). The selected volume is then set as a candidate volume.

Following this, the system calculates the number of candidate volumes, and then judges whether or not there are one or more candidate volumes (137).

When no candidate volume is found, the system judges that no volume satisfies the constraints, thereby ending the processing (139).

In contrast, when one or more candidate volumes are found, the system sorts the candidate volumes in the order of conditions designated by a user (138). To elaborate, the system sorts the candidate volumes in the order of conditions designated in the candidate list sorting order entry field R454 of the constraint designation screen W450 of FIG. 6 (139).

The inter-volume migration system 5000 of the first embodiment selects a candidate volume based on the constraints including the cost constraint. The inter-volume migration system 5000 displays, when plural candidate volumes are selected, a list of the candidate volumes with a corresponding cost value added thereto. Thus, the inter-volume migration system 5000 can determine a relocation-destination volume from a cost viewpoint.

Second Embodiment

A second embodiment of this invention aims at calculating a cost based on the total cost of a storage subsystem.

An information processing system of the second embodiment has the same configuration as the information processing system of the first embodiment as shown in FIG. 1 except the cost calculation program 5200. Hence, detailed description of components except the cost calculation program 5200 is omitted here.

Figures 11, 12:
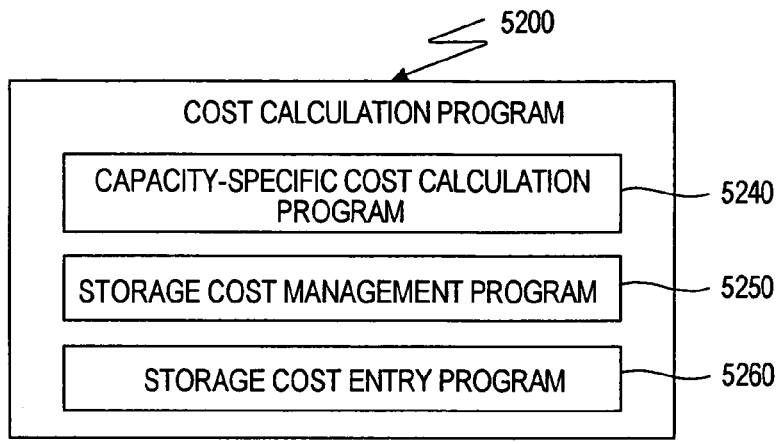
FIG. 11 is a block diagram of the cost calculation program according to a second embodiment of this invention.
FIG. 12 shows a structure of a storage subsystem management table managed with a storage cost management program according to the second embodiment of this invention.

FIG. 11 is a block diagram of the cost calculation program 5200 according to the second embodiment of this invention.

The cost calculation program 5200 includes a capacity-specific cost calculation program 5240, a storage cost management program 5250, and a storage cost entry program 5260.

The storage cost management program 5250 manages a storage subsystem management table of FIG. 12 stored in the database 7000, thereby managing a package price of each of the storage subsystems 1000, 2000, and 3000.

It should be noted that the storage cost management program 5250 corresponds to the disk unit price management program 5220 of the first embodiment. Thus, the storage cost management program 5250 executes the same processing as the disk unit price management program 5220 of the first embodiment except processing described in the second embodiment.

The storage cost entry program 5260 stores information about the package price of each of the storage subsystems 1000, 2000, and 3000 inputted with the input unit 4300, into the storage subsystem management table of FIG. 12, which is stored in the database 7000.

It should be noted that the storage cost entry program 5260 corresponds to the disk unit price entry program 5230 of the first embodiment. Thus, the storage cost entry program 5260 executes the same processing as the disk unit price entry program 5230 of the first embodiment except processing described in the second embodiment.

The capacity-specific cost calculation program 5240 calculates a capacity-specific cost based on the package price of each of the storage subsystems 1000, 2000, and 3000, and the total capacity of volumes belonging to the storage subsystems 1000, 2000, and 3000.

It should be noted that the capacity-specific cost calculation program 5240 corresponds to the unit-price-based cost calculation program 5210 of the first embodiment. Thus, the capacity-specific cost calculation program 5240 executes the same processing as the unit-price-based cost calculation program 5210 except processing described in the second embodiment.

FIG. 12 shows the structure of the storage subsystem management table T300 managed with the storage cost management program 5250 according to the second embodiment of this invention.

The storage subsystem management table T300 lists a record ID (C301), a storage subsystem ID (C302), a package price C303, and a total capacity C304.

The record ID (C301) is a unique identifier of each record in the storage subsystem management table T300. The storage subsystem ID (C302) is a unique identifier of the storage subsystem 1000, 2000, or 3000.

The package price C303 represents a package price of each of the storage subsystems 1000, 2000, and 3000, and is represented in yen (¥), for example. The total capacity C304 represents the total capacity of volumes belonging to storage subsystems 1000, 2000, and 3000, and is represented in gigabytes (GB), for example.

Figure 13:
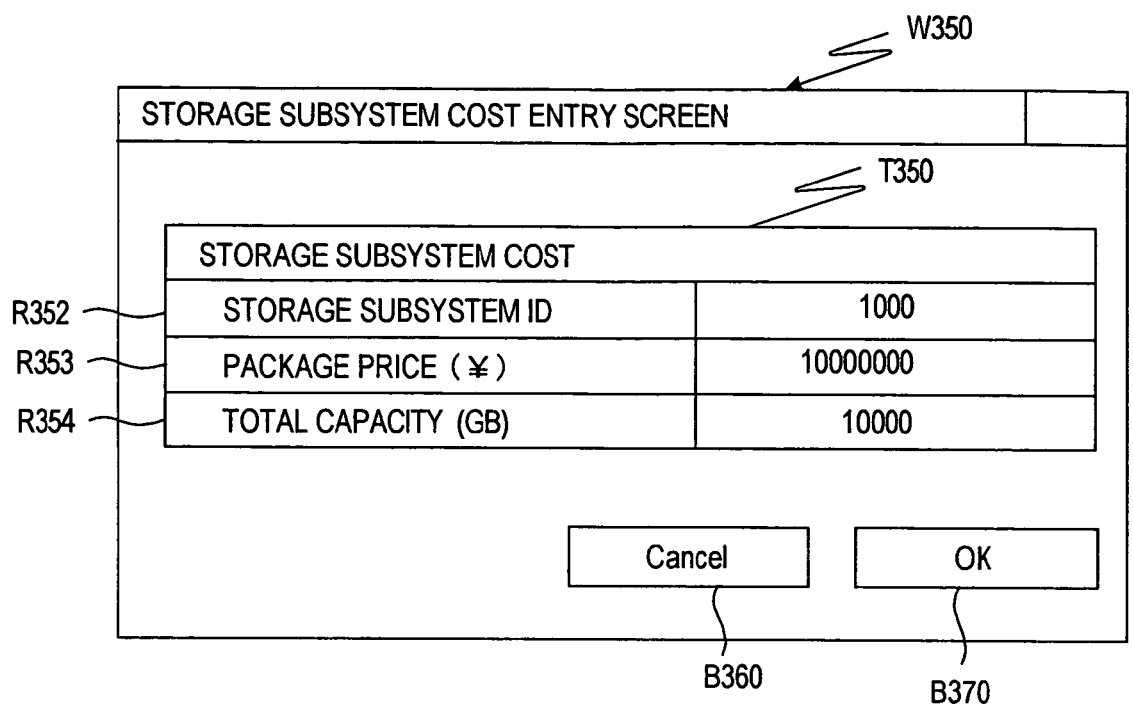
FIG. 13 illustrates a storage subsystem cost entry screen displayed on the output unit according to the second embodiment of this invention.

FIG. 13 illustrates the storage subsystem cost entry screen W350 displayed on the output unit 4400 of the second embodiment of this invention.

The storage cost entry program 5260 instructs the output unit 4400 to display the storage subsystem cost entry screen W350 upon updating the storage subsystem management table T300.

The storage subsystem cost entry screen W350 includes a storage subsystem cost entry table T350, a cancel button B360, and an OK button B370.

The storage subsystem entry table T350 lists a storage subsystem ID entry field R352, a package price entry field R353, and a total capacity entry field R354. A user enters information to be registered to the storage subsystem management table T300, in the entry fields R352 to R354.

Entered in the storage subsystem ID entry field R352 is a unique identifier of each of the storage subsystems 1000, 2000, and 3000.

Entered in the package price entry field R353 is a package price of each of the storage subsystems 1000, 2000, and 3000.

Entered in the total capacity entry field R354 is the total capacity of volumes belonging to the storage subsystems 1000, 2000, and 3000.

When the cancel button B360 is clicked, the storage cost entry program 5260 ends the updating of the storage subsystem management table T300.

When the OK button B370 is clicked, the storage cost entry program 5260 updates the storage subsystem management table T300 based on the information entered into the storage subsystem cost entry table T350.

To be specific, the storage cost entry program 5260 adds a new record to the storage subsystem management table T300. Next, a value different from that of a record ID (C301) of another record is set as a record ID (C301) of the additional record.

Following this, the value entered in the storage subsystem ID entry field R352 of the storage subsystem cost entry table T350 is set as a storage subsystem ID (C302) of the additional record. Then, the information entered in the package price entry field R353 of the storage subsystem cost entry table T350 is set as a package price C303 of the additional record.

Subsequently, the value entered into the total capacity entry field R354 is set as a total capacity C304 of the additional record.

The storage cost entry program 5260 updates the storage subsystem management table T300 in the above manner.

Next, description will be given of processings executed by the inter-volume migration system 5000 of the second embodiment.

The inter-volume migration system 5000 executes the same processing as the first embodiment except the step 133 of the candidate volume selection processing of FIG. 10. Therefore, detailed description of the steps except the step 133 of the candidate volume selection processing is omitted here.

The inter-volume migration system 5000 calculates a cost of a volume satisfying indispensable constraints in the step 133 of the candidate volume selection processing of FIG. 10.

To be specific, the system determines a storage subsystem ID of one of the storage subsystems 1000, 2000, and 3000 to which a volume satisfying the indispensable constraints belongs. The system then selects a record in the storage subsystem management table T300, where the determined storage subsystem ID matches a storage subsystem ID (C302) in the storage subsystem management table T300. After that, the system extracts the package price C303 and the total capacity C304 from the selected record.

Following this, the system selects a record in the volume management table T200, where a logical ID of the volume matches a logical ID (C201) of the volume management table T200. The system then extracts the capacity C205 from the selected record.

Subsequently, dividing the extracted capacity (C205) by the extracted total capacity (C304) gives a specific capacity of the volume. The specific capacity indicates a ratio of the capacity of the volume to the total volume of the storage subsystem 1000, 2000, or 3000 to which the volume belongs.

Multiplying the extracted package price (C302) by the calculated specific capacity gives a capacity-specific cost.

The inter-volume migration system 5000 of the second embodiment calculates a cost based on the package price. The package price includes a disk controller's price, and the price of the package itself besides the price of the disk. Further, the package price may include a maintenance cost. Therefore, the inter-volume migration system 5000 of the second embodiment can select the relocation-destination volume based on a substantial cost of the volume.

Third Embodiment

A third embodiment of this invention aims at calculating a cost based on a current price of a volume.

An information processing system of the third embodiment has the same configuration as the information processing system of the first embodiment as shown in FIG. 1 except the cost calculation program 5200. Thus, detailed description of components except the cost calculation program 5200 is omitted here.

Figure 14:
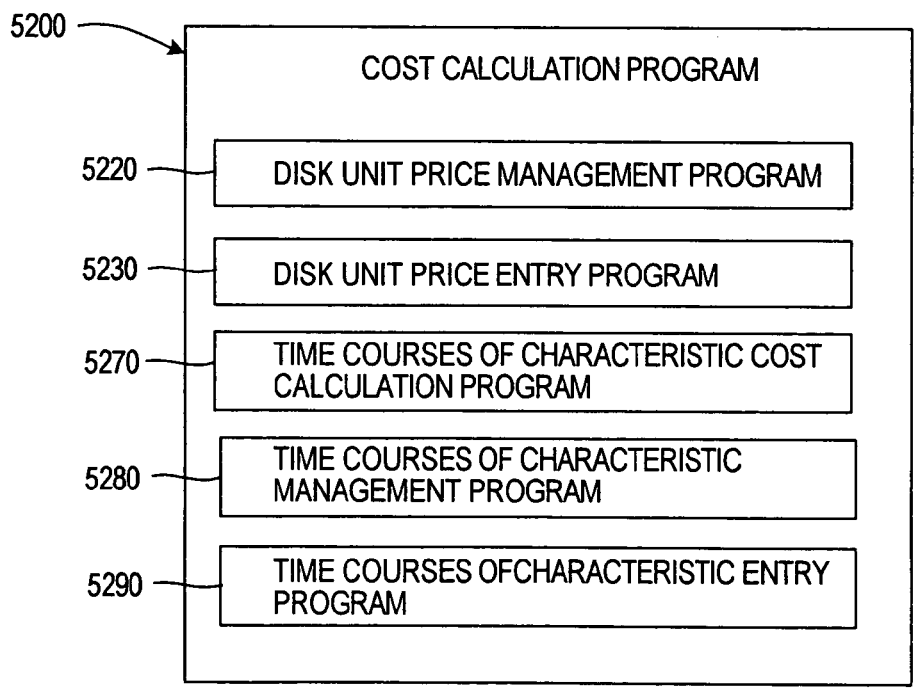
FIG. 14 is a block diagram of the cost calculation program according to a third embodiment of this invention.

FIG. 14 is a block diagram of the cost calculation program 5200 according to the third embodiment of this invention.

The cost calculation program 5200 includes a disk unit price management program 5220, a disk unit price entry program 5230, a time based characteristic cost calculation program 5270, a time based characteristic management program 5280, and a time based characteristic entry program 5290.

The disk unit price management program 5220 and the disk unit price entry program 5230 are the same as those in the cost calculation program 5200 of the first embodiment. The same components are denoted by like reference symbols, and their description is omitted here.

The time based characteristic management program 5280 manages a chronological variation of a characteristic of a unit price of a physical disk constituting a volume. The time based characteristic entry program 5290 stores a time based characteristic of the physical disk inputted with the input unit 4300, into the database 7000.

The time based characteristic cost calculation program 5270 calculates a decrease rate of a disk unit price based on the time based characteristic managed with the time courses of characteristic management program 5280. For example, the decrease rate of the disk unit price is calculated by dividing the elapsed period (years) from the first use of the disk until the current time by a depreciation period of the disk.

Next, the time based characteristic cost calculation program 5270 calculates a current unit price of a disk based on the calculated decrease rate and a disk unit price managed with the disk unit price management program 5220.

FIG. 15 shows the structure of the disk unit price management table T100 managed with the disk unit price management program 5220 of the third embodiment of this invention.

The disk unit price management table T100 of the third embodiment has the same structure as the disk unit price management table of the first embodiment as shown in FIG. 3 except that a use start date C106 is added. Hence, the same components are denoted by like reference symbols and their description is omitted here.

The use start date/time C106 represents the date and time when the storage subsystems 1000, 2000, and 3000 composed of the disk come into use.

It should be noted that the time courses of characteristic cost calculation program 5270 calculates the elapsed period (years) from the first use of the disk until the current time by subtracting the use start date C106 from the current date.

Next, description will be given of processings executed by the inter-volume migration system 5000 of the third embodiment.

The inter-volume migration system 5000 executes the same processing as the first embodiment except the step 133 of the candidate volume selection processing of FIG. 10. Therefore, detailed description of the steps except the step 133 of the candidate volume selection processing is omitted here.

The inter-volume migration system 5000 calculates a current cost of a volume satisfying indispensable constraints in the step 133 of the candidate volume selection processing of FIG. 10.

To be specific, the inter-volume migration system 5000 derives a current cost "C1" of the volume from the following expression (3):

$$C1 = P1/V0 * D2/D1 \qquad (3)$$

where D1 represents the number of disk drives engaging in date writing/reading in a RAID disk (i.e., disk drives except disk drives for parity check), D2 represents the number of disk drives constituting the RAID disk, P1 represents a current unit price of a physical disk constituting the volume, and V0 represents a capacity of the physical disk constituting the volume.

The inter-volume migration system 5000 of the third embodiment calculates a current cost of a volume based on the current price of the disk. Thus, the inter-volume migration system 5000 of the third embodiment can select a relocation-destination volume considering a disk value that has lowered with time.

Fourth Embodiment

A fourth embodiment of this invention aims at calculating a cost based on a use period of a relocation-destination volume.

An information processing system of the fourth embodiment has the same configuration as the information processing system of the third embodiment as shown in FIG. 1 except the cost calculation program 5200. Hence, detailed description of the components except the cost calculation program 5200 is omitted here.

FIG. 16 is a block diagram of the cost calculation program 5200 according to the fourth embodiment of this invention.

The cost calculation program 5200 of the fourth embodiment has the same configuration as the cost calculation program of the third embodiment as shown in FIG. 14 except that a time-average cost calculation program 5300 is added. The same components are denoted by like reference symbols, and their description is omitted here.

The time-average cost calculation program 5300 calculates an average current unit price of a physical disk. The average current unit price is an average value of current unit prices of a physical disk over a use period of the volume. Here, the use period of the volume is inputted with the input unit 4300.

Next, description will be given of processings executed by the inter-volume migration system 5000 of the fourth embodiment.

The inter-volume migration system 5000 executes the same processing as the third embodiment except the step 133 of the candidate volume selection processing of FIG. 10. Therefore, detailed description of the steps except the step 133 of the candidate volume selection processing is omitted here.

The inter-volume migration system 5000 calculates an average current cost of a volume satisfying indispensable constraints in the step 133 of the candidate volume selection processing of FIG. 10.

To be specific, the inter-volume migration system 5000 derives an average current cost "C2" of the volume from the following expression (4):

$$C2 = P2/V0 * D2/D1 \quad (2)$$

where D1 represents the number of disk drives engaging in date writing/reading in a RAID disk (i.e., disk drives except disk drives for parity check), D2 represents the number of disk drives constituting the RAID disk, P2 represents an average current unit price of a physical disk constituting the volume, and V0 represents a capacity of the physical disk constituting the volume.

The inter-volume migration system 5000 of the fourth embodiment calculates a cost of a volume based on the average current unit price of the physical disk. Thus, the inter-volume migration system 5000 of the fourth embodiment can select the relocation-destination volume based on a use period of the volume.

Fifth Embodiment

According to a fifth embodiment of this invention, constraints on a physical characteristic of a relocation-destination volume are designated by a user.

An information processing system of the fifth embodiment has the same configuration of the information processing system of the first embodiment as shown in FIG. 1, and thus its detailed description is omitted here.

Figure 17:
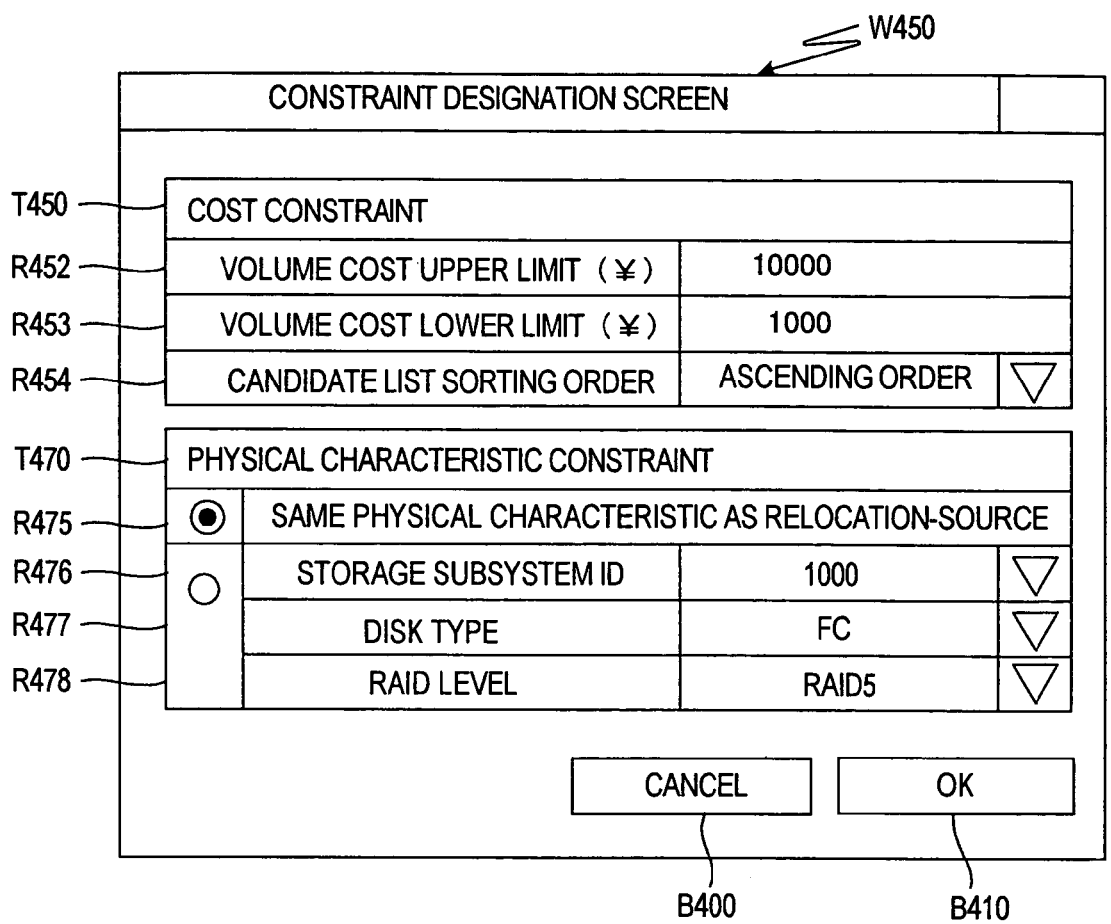
FIG. 17 illustrates a constraint designation screen displayed on the output unit according to a fifth embodiment of this invention.

FIG. 17 illustrates the constraint designation screen W450 displayed on the output unit 4400 according to the fifth embodiment of this invention.

The constraint designation screen W450 of the fifth embodiment has the same structure as the constraint designation screen of the first embodiment as shown in FIG. 6 except that a physical characteristic constraint table T470 is added. The same components are denoted by like reference symbols, and their description is omitted here.

The physical characteristic constraint table T470 lists a same physical characteristic selection field R475, a storage subsystem ID entry field R476, a disk type entry field R477, and a RAID level entry field R478. A user enters constraints in the entry fields R475 to R478.

When the same physical characteristic selection field R475 is marked, the candidate volume selection program 5710 selects only a volume having the same physical characteristic as a relocation-source volume.

Entered in the storage subsystem ID entry field R476 is a unique identifier of the storage subsystem 1000, 2000, or 3000 to which a volume selected as a candidate volume belongs.

Entered in the disk type entry field R477 is a type of a disk constituting the volume selected as the candidate volume.

Entered in the RAID level entry field R478 is a RAID attribute of the volume selected as the candidate volume.

It should be noted that the storage subsystem ID entry field R476, the disk type entry field R477, and the RAID level entry field R478 can be filled in only when the same physical characteristic selection field R475 is not marked.

Next, description will be given of processings executed by the inter-volume migration system 5000 according to the fifth embodiment of this invention.

The inter-volume migration system 5000 executes the same processing as the first embodiment except the step 131 of the candidate volume selection processing of FIG. 10. Hence, detailed description of the steps except the step 131 of the candidate volume selection processing is omitted here.

The inter-volume migration system 5000 searches for a volume satisfying a physical characteristic constraint designated by a user as well as the indispensable constraint in the step 131 of the candidate volume selection processing of FIG. 10.

The inter-volume migration system 5000 of the fifth embodiment allows a user to designate a constraint on the physical characteristic of a relocation-destination volume. Thus, the inter-volume migration system 5000 can select a relocation-destination volume from the viewpoints of cost performance and physical characteristic.

Sixth Embodiment

According to a sixth embodiment of this invention, constraints are previously registered in the database 7000 of the inter-volume migration system 5000. The inter-volume migration system 5000 selects a relocation-destination volume based on the previously registered constraints.

An information processing system of the sixth embodiment has the same configuration as the information processing system of the fifth embodiment as shown in FIG. 1 except the constraint management program 5500. Hence, detailed description of the components except the constraint management program 5500 is omitted here.

Figure 18:
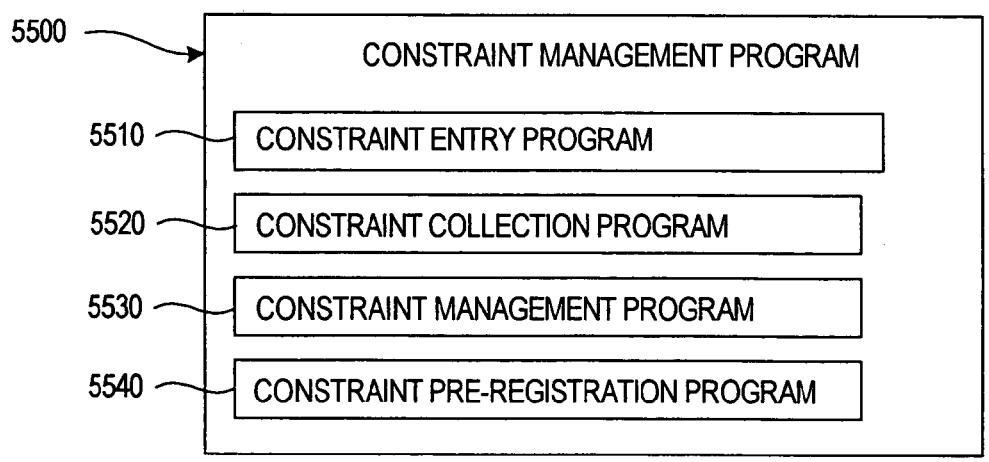
FIG. 18 is a block diagram of a constraint management program according to a sixth embodiment of this invention.

FIG. 18 is a block diagram of the constraint management program 5500 according to the sixth embodiment of this invention.

The constraint management program 5500 of the sixth embodiment has the same configuration as the constraint management program of the fifth embodiment as shown in FIG. 2 except that a constraint pre-registration program 5540 is added. Hence, the same components are denoted by like reference symbols, and their description is omitted here.

The constraint pre-registration program 5540 stores constraints collected with the constraint entry program 5510 in a constraint management table T400 of FIG. 19 stored in the database 7000.

FIG. 19 is a structural diagram of the constraint management table T400 managed with the constraint management program 5530 according to the sixth embodiment of this invention.

The constraint management table T400 lists a record ID (C401), a constraint name C402, a cost upper limit C403, a cost lower limit C404, a sorting order C405, a storage subsystem ID (C406), a disk type C407, and a RAID level C408.

The record ID (C401) is a unique identifier of a record in the constraint management table T400. The constraint name C402 is a unique identifier of a constraint.

The cost upper limit C403 represents a constraint on an upper value of a volume cost. The cost lower limit C404 represents a constraint on a lower value of a volume cost.

The sorting order C405 represents a display order in which the output unit 4400 displays volumes (candidate volumes) satisfying the constraint.

The storage subsystem ID (C406) represents a constraint on a storage subsystem to which the volume belongs. The disk type C407 represents a constraint on a type of a disk constituting the volume. The RAID level C408 represents a constraint on a RAID attribute of the volume.

It should be noted that "null" is set as the cost upper limit C403, the cost lower limit C404, the storage subsystem ID (C406), the disk type C407, and the RAID level C408 in the case where the volume selection is not limited by the constraint.

FIG. 20 illustrates the constraint designation screen W450 displayed on the output unit 4400 according to the sixth embodiment of this invention.

The constraint designation screen W450 of the sixth embodiment has the same structure as the constraint designation screen of the fifth embodiment as shown in FIG. 17 except that a constraint name entry field R451 is added. The same components are denoted by like reference symbols, and their description is omitted here.

Entered in the constraint name entry field R451 is a name of the constraint on a relocation-destination volume.

When the OK button B410 is clicked, the constraint pre-registration program 5540 updates the constraint management table T400 based on information entered to the constraint designation screen W450.

To be specific, the constraint pre-registration program 5540 creates and adds a new record to the constraint management table T400. Next, a value different from a record ID (C401) of another record is set as a record ID (C401) of the additionally created record.

Next, the value entered in the constraint name entry field R451 of the constraint management table T400 is set as a constraint name C402 of the additional record. Subsequently, the value entered in the volume cost upper limit entry field R452 of the constraint management table T400 is set as a cost upper limit C403 of the additional record. Following this, the value entered in the volume cost lower limit entry field R453 of the constraint management table T400 is set as a cost lower limit C404 of the additional record.

After that, the value entered in the candidate list sorting order entry field R454 of the constraint management table T400 is set as a sorting order C405 of the additional record.

Then, the system checks whether or not the same physical characteristic selection field R474 is marked. When the same physical characteristic selection field R474 is marked, a "relocation source" is set as each of a storage subsystem ID (C406), disk type C407, and RAID level C408 of the additional record.

In contrast, when the same physical characteristic selection field R474 is not marked, the value entered in the storage subsystem ID entry field R476 of the constraint management table T400 is set as the storage subsystem ID (C406) of the additional record. Then, the value entered in the disk type entry field R477 of the constraint management table T400 is set as the disk type C407 of the additional record. Then, the value entered in the RAID level entry field R478 of the constraint management table T400 is set as the RAID level C408 of the additional record.

The inter-volume migration system 5000 according to this embodiment allows previous registration of the constraints. This reduces the number of constraints that must be entered by a user for each inter-volume relocation request, which is otherwise burdensome to the user.

Seventh Embodiment

In a seventh embodiment of this invention, inter-volume relocation is automatically executed.

An information processing system of this embodiment has the same configuration as the information processing system of the sixth embodiment as shown in FIG. 1 except the configuration of the inter-volume migration system 5000. Hence, detailed description of components except the inter-volume migration system 5000 is omitted here.

Figure 21:
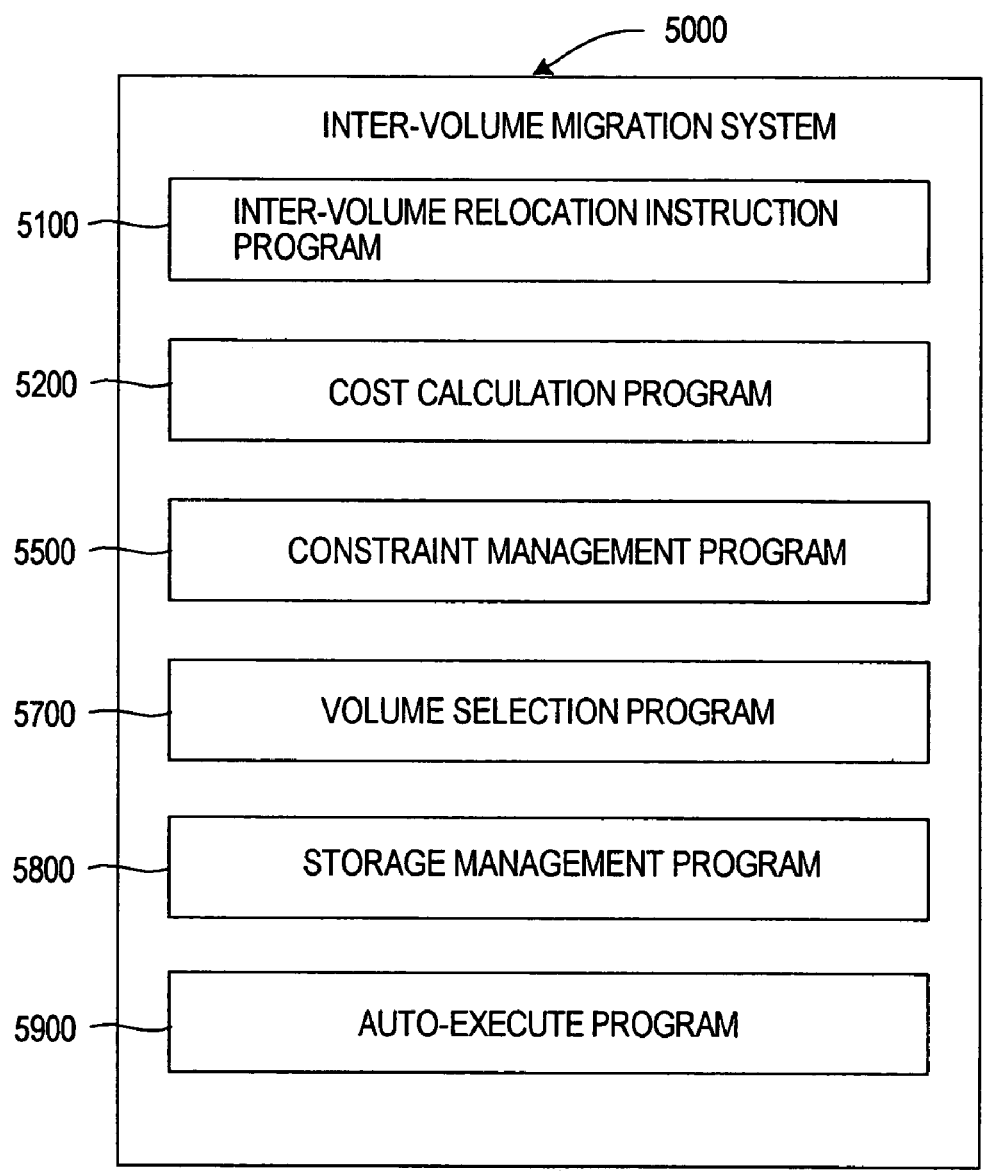
FIG. 21 is a block diagram of the inter-volume migration system according to a seventh embodiment of this invention.

FIG. 21 is a block diagram of the inter-volume migration system 5000 according to the seventh embodiment of this invention.

The inter-volume migration system 5000 has the same configuration as the constraint management program of the sixth embodiment as shown in FIG. 2 except that an auto-execute program 5900 is added. Hence, the same components are denoted by like reference numerals, and their description is omitted here.

Upon detection of a predetermined trigger, the auto-execute program 5900 executes an inter-volume relocation processing. To be specific, the auto-execute program 5900 extracts the constraints associated with the relocation-source volume from the constraint management table as shown in FIG. 22. Then, the relocation-destination volume is selected based on the extracted constraints.

The examples of the predetermined trigger include addition and deletion of the storage subsystems 1000, 2000, and 3000. Further, by setting an inter-volume relocation request from a user as the predetermined trigger, the inter-volume migration system 5000 can automatically execute inter-volume relocation even when the inter-volume relocation is requested from a user.

FIG. 22 shows a structure of the constraint management table T400 managed with the constraint management program 5530 according to the seventh embodiment of this invention.

The constraint management table T400 has the same structure as the constraint management table of the sixth embodiment as shown in FIG. 19 except that a target volume C409 is added. Hence, the same components are denoted by like reference numerals, and their description is omitted here.

The target volume C409 is a unique identifier of the relocation-source volume associated with the constraints.

In other words, upon detection of a predetermined trigger, the inter-volume migration system 5000 selects from the constraint management table T400 a record in which the ID of the relocation-source volume matches the target volume C409 of the constraint management table T400. Then, the inter-volume migration system 5000 selects the relocation-destination volume based on the constraints set in the selected record.

The inter-volume migration system 5000 of the seventh embodiment includes the auto-execute program 5900. Accordingly, the inter-volume migration system 5000 can automatically execute inter-volume relocation.

While the present invention has been described in detail and pictorially in the accompanying drawings, the present invention is not limited to such detail but covers various obvious modifications and equivalent arrangements, which fall within the purview of the appended claims.

What is claimed is:

1. An inter-volume migration system, comprising:
   a storage subsystem having one or more volumes;
   an inter-volume relocation instruction module that relocates a relocation-source volume to a relocation-destination volume for copy data stored in the relocation-source volume;

a cost calculation module that calculates a cost of a volume; and a volume selection module that selects a candidate for the relocation-destination volume, whose cost is within an upper limit and lower limit of the cost per unit capacity, based on the cost of the volume calculated by the cost calculation module and constraints imposed on the relocation-destination volume;

a constraint pre-registration module that previously registers the constraints to be imposed on the relocation-destination volume in association with the relocation-source volume; and a processing module that executes an inter-volume relocation processing, wherein the processing module obtains the constraints relating to the relocation-source volume from among the constraints previously registered by the constraint pre-registration module, wherein the volume selection module selects the candidate for the relocation-destination volume whose size is larger than the relocation-source volume size and which is unused, based on the constraints obtained by the processing module, and wherein the cost calculation module calculates the cost of the volume based on a chronological variation of a unit price of at least one disk including the volume.

2. The inter-volume migration system according to claim 1, further comprising a constraint management module that manages the constraints imposed on the relocation-destination volume.

3. The inter-volume migration system according to claim 1, further comprising a cost condition designation module that accepts entry of conditions relating to the cost of the relocation-destination volume and includes the designated conditions relating to the cost into the constraints, wherein the volume selection module selects the candidate for the relocation-destination volume by comparing the conditions relating to the cost included in the constraints with the cost of the volume calculated by the cost calculation module.

4. The inter-volume migration system according to claim 1, wherein the cost calculation module calculates the cost of the volume based on a physical configuration of disks including the volume and a unit price of the disk constituting the volume.

5. The inter-volume migration system according to claim 4, further comprising:

a disk unit price entry module that accepts entry of the unit price of the disk constituting the volume; and a disk unit price management module that manages the unit price of the disk entered into the disk unit price entry module.

6. The inter-volume migration system-according to claim 1, wherein the cost calculation module calculates the cost of the volume based on a total cost of the storage subsystem including the volume.

7. The inter-volume migration system according to claim 6, further comprising:

a storage cost entry module that accepts entry of the total cost of the storage subsystem including the volume; and a storage cost management module that manages the total cost of the storage subsystem entered into the storage cost entry module.

8. The inter-volume migration system according to claim 1, further comprising:

a time based characteristic entry module that accepts entry of a time based unit price of the disks including the volume; and a time-based characteristic management module that manages the time based characteristic entered into the time based characteristic entry module.

9. The inter-volume migration system according to claim 1, further comprising a use period entry module that accepts entry of a use period of the relocation-destination volume, wherein the cost calculation module calculates the cost of the volume to be used in the period entered into the use period entry module.

10. The inter-volume migration system according to claim 1, further comprising a physical characteristic designation module that accepts entry of a condition relating to physical characteristics of the relocation-destination volume and includes the entered condition relating to the physical characteristics into the constraints, wherein the volume selection module selects the volume satisfying the conditions relating to the physical characteristics included in the constraints as the candidate for the relocation-destination volume.

11. The inter-volume migration system according to claim 10, wherein when a physical characteristic designation module that accepts entry of a condition that the physical characteristics are the same between the relocation-source volume, the volume selection module selects the volume having the same physical characteristics as the relocation-source volume as the candidate for the relocation-destination volume.

12. The inter-volume migration system according to claim 1, further comprising a constraint pre-registration module that previously registers the constraints to be imposed on the relocation-destination volume.

13. The inter-volume migration system according to claim 1, wherein:

the processing module, upon detection of a predetermined trigger, obtains the constraints relating to the relocation-source volume from among the constraints previously registered by the constraint pre-registration module.

14. An inter-volume relocation method used in an inter-volume migration system that comprises a storage subsystem having one or more volumes and an inter-volume relocation instruction module that relocates a relocation-source volume to a relocation-destination volume for copy data stored in the relocation-source volume, the inter-volume relocation method comprising:

calculating a cost of a volume;

selecting a candidate for the relocation-destination volume based on the calculated cost of the volume and constraints imposed on the relocation-destination volume;

previously registering the constraints to be imposed on the relocation-destination volume in association with the relocation-source volume;

executing an inter-volume relocation-processing;

obtaining the constraints relating to the relocation-source volume from among the constraints previously registered; and selecting the candidate for the relocation-destination volume based on the obtained constraints, wherein the step of calculating a cost of a volume calculates the cost of the volume based on a chronological variation of a characteristic of a unit price of at least one disk including the volume.

15. A machine-readable medium, containing at least one sequence of instructions that, when executed, causes a computer program for controlling an inter-volume migration system that includes a storage subsystem having one or more volumes and an inter-volume relocation instruction module that relocates a relocation-source volume to a relocation-destination volume for copy data stored in the relocation-source volume, the program controlling the inter-volume migration system to:

calculate a cost value of a volume based on a chronological variation of a characteristic of a unit price of at least one disk including the volume;

select a candidate for the relocation-destination volume based on the calculated cost value of the volume and constraints imposed on the relocation-destination volume;

previously registering the constraints to be imposed on the relocation-destination volume in association with the relocation-source volume;

executing an inter-volume relocation processing;

obtaining the constraints relating to the relocation-source volume from among the constraints previously registered; and selecting the candidate for the relocation-destination volume based on the obtained constraints.

* * * * *